Oct. 12, 1965  J. F. WITTE  3,211,533
CRYSTALLIZER VESSEL
Filed May 27, 1960
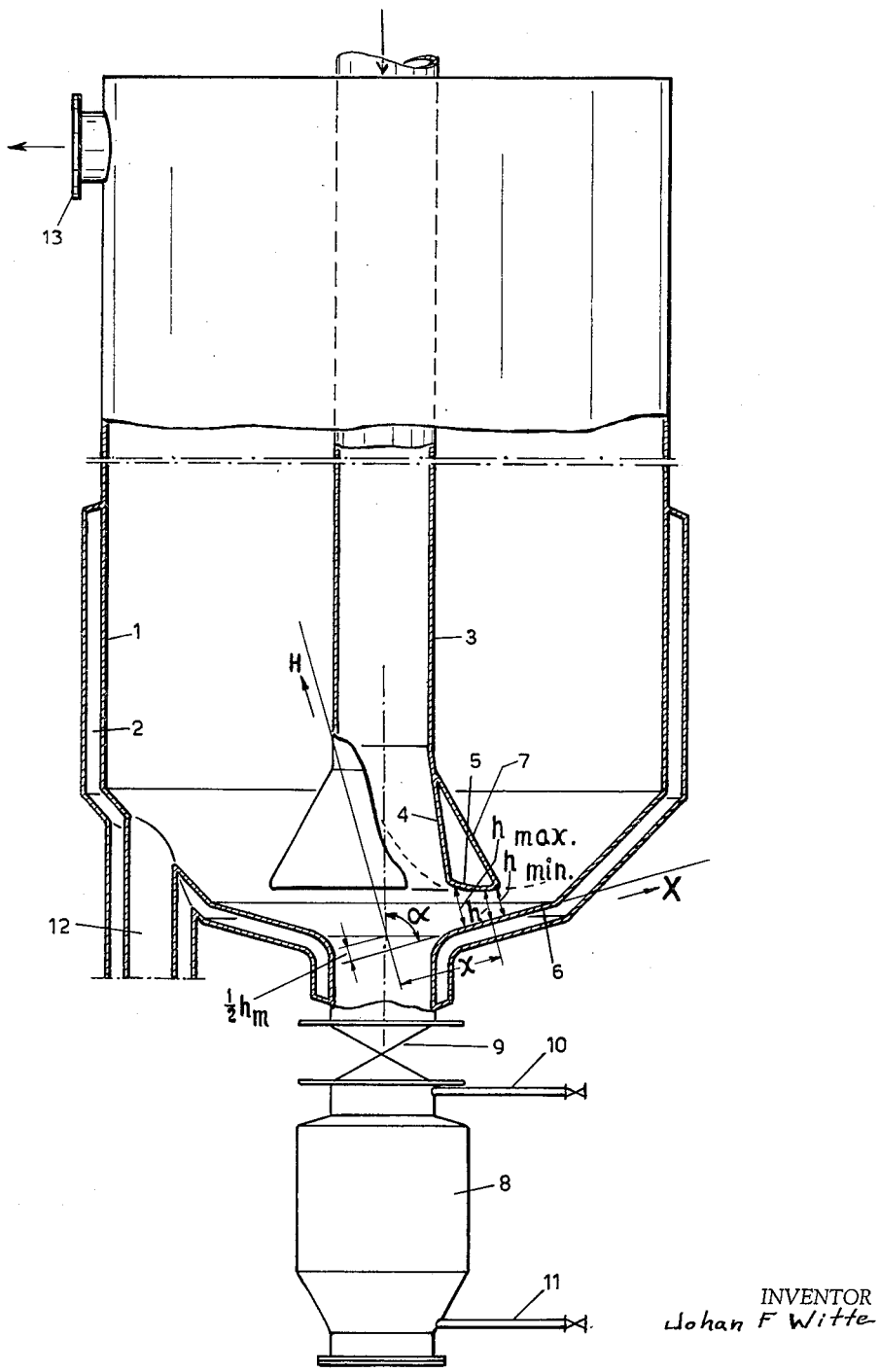
INVENTOR
Johan F Witte
BY
ATTORNEY

3,211,533
CRYSTALLIZER VESSEL
Johan F. Witte, Amsterdam, Netherlands, assignor to Werkspoor N.V., Amsterdam, Netherlands, a company of The Netherlands
Filed May 27, 1960, Ser. No. 32,318
Claims priority, application Netherlands, June 9, 1959, 239,984
4 Claims. (Cl. 23—273)

The invention relates to a vessel, in which solid particles are maintained in suspension in a liquid or gaseous fluid, which is introduced into the vessel above the conical bottom thereof by a vertical tube open at its lower end, said vessel having at or near its upper end an outlet for the liquid or gaseous fluid and at or near its bottom an outlet for the solid particles to be obtained. A vessel of this kind may be used as a crystallizer but also as a dryer or a reaction tank.

If such a vessel is used as a crystallizer a supersaturated solution is introduced into the vessel and saturated liquid is withdrawn at the upper end of the vessel and the difficulty arises that large lumps of crystallized material and crusts can be formed into the supply tube and at the bottom and the walls of the vessel, said lumps and crusts being released from time to time and are then taken up as coarse pieces in the suspended mass of crystals so that said pieces can give rise to clogging of the inlet and the outlet of the vessel.

The invention has for its object to remove the above mentioned drawbacks and to this end the bottom of the vessel according to the invention is provided below the open outflow end of the vertical supply tube with a second outlet to which a settling or sediment tank is connected. The coarse lumps in the supply tube and also at the sloping bottom of the vessel will now fall into said settling tank from where they may ocntinuously or periodically be removed. In this way the undesired coarse pieces may thus be discharged separately from the desired solid particles.

In order to prevent that the velocity of the fluid at the inflow opening of the vessel becomes so small that the larger solid particles which are desired to be maintained in suspension are also received in the settling tank the smallest flow area of the inflow opening of the vessel around the outlet end for the fluid should not exceed a predetermined value which also depends on the range of the size of particles to be maintained in suspension in the vessel.

To this end a wall may be provided around the outlet of the supply tube, said wall converging with respect to the bottom of the vessel towards the outer periphery thereof and preferably in such a manner that the slot passage which said wall leaves with respect to the bottom of the vessel has a certain radial length and the smallest flow area of said slot or passage, measured by the area of it annular outer exit is smaller than or does not exceed ¹⁄₁₀ of the cross-sectional area of the vessel measured at some distance above the bottom of the vessel, said value of the smallest annular cross-sectional area of the passage is applicable in case the range of the size of the particles does not exceed the factor 6. If said smallest cross-sectional or flow area is made larger, e.g. ⅛ of the cross sectional area of the vessel above the bottom a portion of the particles which could be maintained in suspension in the vessel will fall down towards the settling tank. If desired said particles may be returned from the settling tank to the vessel. Said smallest flow area of the inflow opening constituted by the slot referred to above may be larger as the flow area of the slot is kept constant a longer way in the direction of flow. By the provision of the wall converging towards the bottom of the vessel around the outlet opening of the supply tube the flow of the fluid leaving said tube is deflected through more than 90°.

The invention will be further described with reference to the accompanying drawing showing by way of example a vessel according to the invention in sectional elevation.

The lower part of the vessel 1 has a jacket 2 into which a heating or a cooling fluid may be introduced. A supply tube 3 extends downwards in the vessel and has its outflow nozzle 4 widening towards the outlet.

Around the outlet of the tube 3 a wall 5 is provided leaving a slot $h$ with respect to the conical bottom 6 of the vessel, said slot having its height decreasing towards the outer periphery of the vessel bottom. In order to prevent the formation of a dead angle above the wall 5 and to guide the flow ascending in the vessel a cone 7 joins above the wall 5 to the circumference of the supply tube 3.

The upper end of the vessel is provided with an outlet 13 for the fluid. Below the supply conduit 3 a settling tank 8 is connected to the bottom of the vessel 1 through the intermediary of a sluice 9. Said settling tank is provided with a deaeration tube 10 and with a flushing conduit 11 which has for its object to again dissolve the coarse pieces received in said vessel.

The flow of fluid leaving the slot-like opening formed between the bottom 6 of the vessel and the wall 5 around the supply tube 3 and entering the vessel is obliquely directed upwards and the fluid will ascend in the space between the conical wall 7 and the bottom wall of the vessel with gradually decreasing velocity for maintaining the solid particles in suspension. The precipitating coarser particles leave the vessel through an outlet 12.

For securing the large solid pieces to slide down towards the settling tank it is not necessary that the annular cross-sectional area of the slot formed between the wall 5 and the bottom wall 6 of the vessel continuously decreases towards the circumference of the vessel. The flow area of the slot may, however, be constant on a certain distance in the direction of flow and to this end the height $h$ of the slot should vary hyperbolically. The height $h$ of the slot, that is the length of the normal on the conical surface forming the bottom 6 of the vessel, expressed in $x$, that is the abscissa of rectangular coordinate axes, the $x$-axis of which in the drawing is drawn along the generatrix of the conical surface and the H-axis of which intersects the axis of the supply tube 3 in a point, for which $h = \frac{1}{2}$ hm., where hm. is the arithmetical average between the smallest height $h$ min. and the largest height $h$ max. of the slot, meets the following equation:

$$h = \frac{(D^2 - d^2)}{64 \times \sin \alpha}$$

wherein:

$D$ = diameter of the vessel above the bottom,
$d$ = diameter of the supply tube 3,
$\alpha$ = half the apex angle of the cone of the bottom or the lower bottom part.

Said equation for the height of the slot is applicable in case the annular area of the inflow opening formed by the slot is fixed to ⅛ of the cross sectional area of the vessel measured at some distance above the bottom of the vessel.

A crystallizer meeting the above requirements has been used for obtaining coarse kitchen salt with a mean particle size of about 2 mm., at temperatures of 40° to 110° C., whereby the supersaturation of the brine was varying from 2 gram to 9 gram per L. The vessel consisted of Monel-metal having a polished surface and was provided with a steam jacket. At the bottom no crusts were formed and from the settling tank 8 large solid pieces were repeatedly removed, said pieces being only slightly smaller than the flow area of the supply tube 3 or that of the inflow opening of the vessel formed by the slot. In this connection it is to be noted that the smallest annular area of said inflow opening should preferably at least be equal to the smallest cross-sectional area of the supply tube 3, as otherwise a coarse piece could be clamped at the inflow of the vessel.

It appears that it is not necessary to provide the settling tank with a heating jacket as the tendency for the formation of crusts in said tank is less than that in the vessel.

What I claim is:

1. Apparatus for crystallizing and reacting comprising a vessel having a downwardly converging conical bottom and in which solid particles are maintained in suspension in a fluid, an inlet tube for introducing fluid into the vessel extending vertically into the container and having an open lower end at a level close to the lowest part of said bottom, said tube being conically widened in downward direction at its lower end and having a substantially horizontal flange at the end of said widened part, an outlet for large solid particles in the lowest part of the vessel bottom positioned below said open lower end of the vertical tube, a settling tank connected to said outlet, said flange and said bottom forming an annular passage of substantial length extending radially of the vessel bottom and narrowing in height toward the outer periphery of the bottom, and said vessel having another outlet for smaller solid particles in said conical bottom at a level above said passage and the lower end of the vertical inlet tube.

2. Apparatus according to claim 1, wherein the outer periphery of said horizontal flange is connected by an upwardly and inwardly directed wall to an upper portion of said vertical tube.

3. Apparatus according to claim 1, wherein the flow area of said annular passage is constant throughout the radial length of the passage.

4. Apparatus according to claim 1, wherein the radial length of said annular passage exceeds the height of the passage.

References Cited by the Examiner

UNITED STATES PATENTS

| | | | |
|---|---|---|---|
| 2,025,059 | 12/35 | Kermer | 23—273 |
| 2,164,111 | 6/39 | Jeremiassen | 23—273 |
| 2,567,968 | 9/51 | Saeman | 23—302 |
| 2,623,814 | 12/52 | Gray | 23—273 XR |
| 2,801,907 | 8/57 | Scott | 23—273 |
| 2,827,366 | 3/58 | Saeman | 23—273 |
| 2,921,969 | 1/60 | Loy | 23—273 |

FOREIGN PATENTS

| | | |
|---|---|---|
| 457,301 | 11/36 | Norway. |
| 54,050 | 6/34 | Norway. |

NORMAN YUDKOFF, *Primary Examiner.*

GEORGE D. MITCHELL, MAURICE BRINDISI,
*Examiners.*